Patented July 6, 1937

2,086,309

UNITED STATES PATENT OFFICE 2,086,309

MANUFACTURE OF ARTIFICIAL SILK

John Wharton, Liverpool, England, assignor to American Enka Corporation, Enka, N. C., a corporation of Delaware No Drawing. Application June 1, 1936, Serial No. 82,981. In the Netherlands June 11, 1935

5 Claims. (Cl. 106—40)

This invention relates to the manufacture of artificial silk and has particular reference to the provision of an improved cellulosic solution which can be more easily filtered prior to extrusion to form filaments therefrom.

Whereas the invention will be described in connection with viscose type solutions, it is to be understood that other solutions of artificial origin, such as cuprammonium, may be employed and still come within the scope contemplated by the present process.

During the manufacture of rayon by the viscose process, the filtration of the viscose solution has often been difficult and more or less unsatisfactory. When such conditions arise various drawbacks occur during the spinning or extrusion operation and can be traced back to poor behavior during filtration. The origin of the difficulties encountered is probably due to some extent to the preparation of the viscose in the preliminary stages, such as insufficient shredding of the alkali cellulose and/or the irregular xanthate formation. However, it has now been ascertained by extensive experimentation that in addition to the above described difficulties, precipitated solid materials exist in the spinning solution which inhibit the proper filtration of the viscose to a marked degree. These precipitates may be in amorphous form or even in a colloidal state so that in addition to retarding the filtration, certain of the suspended bodies will pass through the filtering medium and will have a bad effect on the spinning operation.

The components which constitute these precipitated bodies are the result of impurities occurring in both the cellulose and caustic soda solution employed in the manufacture of artificial silk. The cellulose always contains small quantities of alkali earth salts which comprise principally calcium but may also have present magnesium and barium. The siliceous impurities occur in the commercial caustic soda used in several of the preliminary stages of the process. The alkali earth metals react or combine with the silicate radicals and produce insoluble precipitates such as calcium silicate. These reactions are especially evident when caustic soda solutions are reclaimed and the original concentration and volume is re-established, after which the caustic is again used in the steeping operation.

It is therefore the object of the present invention to dissolve these insoluble silicates already formed during previous manufacturing steps, and prevent their future formation. By so doing the spinning solution is extremely homogeneous and thereby greatly facilitates the filtration step. It has been determined that the formation of the siliceous precipitates is prevented by adding to the viscose solution a small quantity of an alkali metal hexameta phosphate, such as sodium hexameta phosphate or potassium hexameta phosphate. Upon the addition of this compound, a complex calcium-sodium phosphate molecule is produced which is soluble in the viscose solution. The amount of alkali metal hexameta phosphate to be added is, of course, dependent upon the amount of alkali earth salts in the viscose and by proper calculation may be determined. It is of course to be understood that the alkali metal hexameta phosphate may be added during any of the manufacturing stages, i. e. to the alkali cellulose, cellulose xanthate or to the viscose solution. In some cases it may even be desirable to add this chemical to the steeping or dissolving caustic.

It has been determined that 0.1% of sodium hexameta phosphate added to a normal viscose solution will greatly facilitate the filtration of the viscose solution. The amount is calculated on the total viscose weight.

I claim:

1. In the manufacture of artificial silk, the step which includes adding an alkali metal hexa meta phosphate to a viscose solution prior to filtration whereby the insoluble siliceous materials are rendered soluble to facilitate filtration of the said cellulosic solution.

2. In the manufacture of artificial silk, the step which includes adding sodium hexa meta phosphate to a viscose solution prior to filtration whereby the insoluble siliceous materials are rendered soluble to facilitate filtration of the said cellulosic solution.

3. A method of facilitating the filtration of viscose solutions which comprises adding to the viscose, prior to the filtering step, a solution of sodium hexa meta phosphate whereby insoluble calcium silicates are rendered soluble by their reaction to form complex calcium sodium phosphates.

4. An improved viscose solution characterized by its absence of siliceous precipitates thereby facilitating the filtration thereof, and to which has been added throughout its body an alkali metal hexa meta phosphate.

5. An improved viscose solution, having incorporated therein 0.1% sodium hexa meta phosphate.

JOHN WHARTON.